(12) United States Patent
Gibson

(10) Patent No.: US 12,404,626 B2
(45) Date of Patent: Sep. 2, 2025

(54) DRIVE BELT, IN PARTICULAR TOOTHED BELT, HAVING IMPROVED PROPERTIES AND METHOD FOR PRODUCING SAME

(71) Applicant: Arntz Beteiligungs GmbH & Co. KG, Höxter (DE)

(72) Inventor: Daniel Pattie Gibson, Dumfries (GB)

(73) Assignee: Arntz Beteiligungs GmbH & Co. KG, Höxter (DE)

( * ) Notice: Subject to any disclaimer, the term of this patent is extended or adjusted under 35 U.S.C. 154(b) by 77 days.

(21) Appl. No.: 17/220,247

(22) Filed: Apr. 1, 2021

(65) Prior Publication Data

US 2021/0316521 A1 Oct. 14, 2021

(30) Foreign Application Priority Data

Apr. 3, 2020 (DE) ..................... 10 2020 109 429.9

(51) Int. Cl.
| | |
|---|---|
| *D06M 10/04* | (2006.01) |
| *B29C 70/00* | (2006.01) |
| *B29D 29/08* | (2006.01) |
| *D06M 15/568* | (2006.01) |
| *D06M 23/00* | (2006.01) |

(52) U.S. Cl.
CPC ............. *D06M 10/04* (2013.01); *B29C 70/00* (2013.01); *B29D 29/08* (2013.01); *D06M 15/568* (2013.01); *D06M 23/005* (2013.01); *D10B 2101/12* (2013.01)

(58) Field of Classification Search
CPC .. D06M 10/04; D06M 15/568; D06M 13/395; D06M 15/572; D06M 15/653; D06M 15/564; D10B 2101/12; B29D 29/08; B60C 9/00; F16G 1/00; F16G 5/00
See application file for complete search history.

(56) References Cited

U.S. PATENT DOCUMENTS

| | | | | |
|---|---|---|---|---|
| 5,112,282 A | * | 5/1992 | Patterson | ................... F16G 5/20 474/260 |
| 5,807,194 A | * | 9/1998 | Knutson | ................ B29D 29/08 474/237 |
| 2009/0142572 A1 | * | 6/2009 | Burlett | ....................... F16G 1/08 156/137 |
| 2011/0129647 A1 | * | 6/2011 | Duke, Jr. | ............. D06M 15/568 428/296.4 |
| 2014/0200108 A1 | | 7/2014 | Duke et al. | |

FOREIGN PATENT DOCUMENTS

| | | | |
|---|---|---|---|
| EP | 3617697 A1 | 3/2020 | |
| JP | 2005023481 A * | 1/2005 | ............... D02G 3/48 |
| JP | 6652678 B1 | 1/2020 | |

* cited by examiner

*Primary Examiner* — Jennifer A Steele
(74) *Attorney, Agent, or Firm* — WCF IP

(57) ABSTRACT

In a first aspect, the present invention relates to a method for producing a drive belt, in particular a toothed belt, having a belt body composed of elastic material and a tension member with tensile strands composed of carbon cord. In this case, these carbon cords, in the form of twisted carbon cords, are soaked with a liquid isocyanate solution before they are used as tension members for the drive belts. In a further aspect, a drive belt which can be obtained in this way is provided. This drive belt is in particular a high performance belt, such as a high performance toothed belt, having improved belt running times and adhesion properties of the carbon cord to the belt body.

18 Claims, 1 Drawing Sheet

Figure 1:
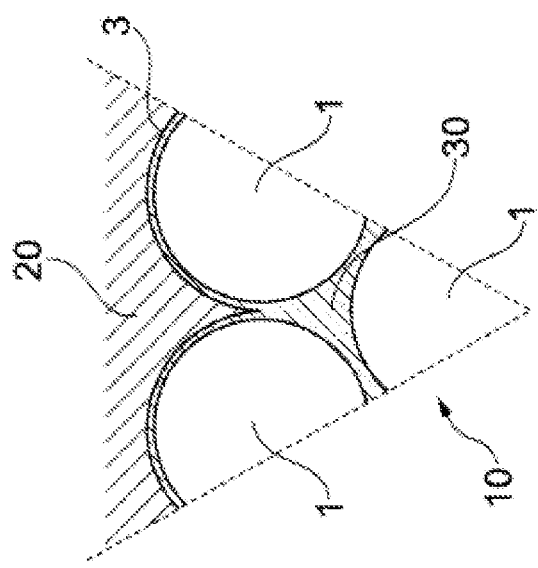

DRIVE BELT, IN PARTICULAR TOOTHED BELT, HAVING IMPROVED PROPERTIES AND METHOD FOR PRODUCING SAME

In a first aspect, the present invention relates to a method for producing a drive belt, in particular a toothed belt, having a belt body composed of elastic material and a tension member with tensile strands composed of carbon cord. In this case, these carbon cords, in the form of twisted carbon cords, are soaked with a liquid isocyanate solution before they are used as tension members for the drive belts. In a further aspect, a drive belt which can be obtained in this way is provided. This drive belt is in particular a high performance belt, such as a high performance toothed belt, having improved belt running times and adhesion properties of the carbon cord to the belt body.

PRIOR ART

EP 2 507 429 describes a belt having an elastomer body and tensile cord in the form of tensile strands, embedded in the elastomer body. In this case, these cords are impregnated with a polyurea-urethane composition, wherein these are a polyurea reaction product of polyurethane prepolymer having isocyanate end groups on the prepolymer molecules and a curing agent, the curing agent being water. Furthermore, a cord in the form of a tensile strand for reinforcing elastomeric articles is described, wherein a part of the cord is wetted with a polyurea-urethane composition comprising the reaction product of polyurethane prepolymer having isocyanate end groups with a reaction product of polyisocyanate and at least one polyol selected from polyester polyol, polycarbonate, polyol or polyether polyol and a chain extender, the chain extender being water. Finally, a method for producing these cords is provided. To this end, said cords, in the form of filament yarn, are immersed in a solution, comprising a polyurethane prepolymer having isocyanate end groups on the prepolymer molecules in a solvent, wherein, after drying, the prepolymer is cured in the presence of water in order to provide tensile strands. These tensile strands are then impregnated with reaction products further used for producing the drive belts.

U.S. Pat. No. 5,116,286 discloses double-layered treatments of cord materials. In this case, isocyanate or epoxy resin is added in a first step, in order to then perform coating in a further step with a further resin, for example a resorcinol-formalin-latex (RFL) solution.

US 2009/0142572 A1 describes a coating of the tensile strands with an isocyanate-terminal diene elastomer as adhesive component. Where appropriate, a first treatment with a low-molecular-weight, reactive isocyanate compound can be carried out in advance. However, this disclosure requires that a coating with an isocyanate-terminal diene elastomer is always carried out. This document requires reaction products to be produced, on account of the moisture and heat, both from the primer coating and from the coating with the diene having terminal isocyanate, said reaction products being substantially polyurea and/or polycyanurate redaction products. That is to say the isocyanates have substantially already reacted.

GB 1 282 535 describes a cord, for example a polyester cord, which is coated with an isocyanate cement.

DE 10 2010 043 322 A1 discloses a drive belt comprising fracture-reducing fillers between the interstices of the carbon fibers which form the carbon cord. These fracture-reducing fillers differ in this case from the elastic materials that form the belt body. These fracture-reducing fillers are selected such that, even after curing of the elastic material, the flexibility of the carbon cord remains unchanged. These fracture-reducing fillers are also intended to improve the properties of the cord in respect of tension behavior, adhesion and flexural strength, such as brittleness.

Mention is made of epoxal resin and/or isocyanate as fracture-reducing fillers. These stated fillers are present in the form of resins. These fracture-reducing fillers can be added to the carbon fibers before or after said carbon fibers are twisted to form the cord.

WO 2013/050143 A1 describes a belt having embedded tension members. In this case, use is made of materials which differ from the elastomer of the belt body and which are located between the strands of the tension member. These materials comprise compounds derived from hydroxyaromatics with aldehydes, without addition of rubber or rubber latex, a non-rubber-containing hydroxyaromatic-aldehyde resin, reaction products of hydroxyaromatics or hydroxyaromatic-aldehyde compounds with isocyanates or isocyanate prepolymers, and/or aromatically or polyaromatically crosslinked polyurethanes. These prepolymers and (co)polymers are intended to protect the cord fibers against breakage and to provide the cord as a whole with substantially better elasticity and flexural properties. In addition, better bonding to surrounding belt elastomers is intended to be possible.

US 2014/0200108 A1 describes a V-shaped CVT belt composed of vulcanized rubber with a tensile cord layer composed of tensile, helically wound cord. Said belt comprises an overcord rubber layer and an undercord rubber layer, and also an upper and a lower tooth profile. The cord is a twisted single-tow yarn composed of adhesively treated and impregnated carbon fibers. The adhesive treatment can be carried out, inter alia, with an isocyanate.

US 2009/0011883 A1 relates to a drive belt having a tensile cord comprising polyester, said cord being subject to a heat shrinkage at 100° C. of less than 1%. The cord can be subjected to an adhesive treatment in a production step, followed by a curing step.

DE 102 36 112 A1 relates to a power transmission belt comprising a compression layer and an adhesive rubber layer, said layers being adhesively bonded to one another by vulcanization. Furthermore, said power transmission belt comprises an aramid fiber cord which is embedded in the adhesive rubber layer. The aramid fiber cords can be pretreated with isocyanate compounds, before they are treated with an RFL adhesive composition.

It is an object of the present invention to provide a drive belt and a method for producing same such that the flexibility of the cord and of the carbon fibers forming the cord in the drive belt is improved and the service life of the cord, and thus of the drive belt, is increased. In addition, the adhesion of the cord to the belt body is intended to be improved. That is to say the tension behavior of the cord with simultaneous adhesion is intended to be optimized while maintaining the flexural strength, such as the tensile stress and flexural fatigue and the tension relationship.

In order to achieve the object, a method according to claim 1 is provided, which is characterized in that twisted carbon cord is soaked with liquid isocyanate solution and this liquid isocyanate solution is not subjected to curing before it is brought into contact with reaction partners for formation of the belt body. That is to say neither partial polymerization nor complete polymerization of the isocyanate with other reaction partners takes place. This includes, for example, no or very little reaction with moisture and water from the air, it rather being the case that the isocyanate used is present soaked in the cord in such a way that said isocyanate takes part in the further polymerization in the scope of the curing of the reaction partners for formation of the belt body.

In addition, a drive belt which can be obtained in this way and which is configured in the form of a power transmission belt or conveyor belt, in particular in the form of a toothed belt, is provided. The method according to the invention and the thus obtainable drive belt are characterized by improved properties with respect to the service life of the belt. Better incorporation of the carbon cord into the elastomers of the belt body provides improved tension behavior and better adhesion, without negatively affecting the flexural strength, that is to say the flexibility.

The method according to the invention is a method for producing a drive belt, in particular a toothed belt, having a belt body composed of elastic material and a tension member with tensile strands, wherein a tension member with the tensile strands is formed from carbon cord and the carbon cord is a cord composed of a multiplicity of carbon fibers which are twisted together to form a carbon cord, said method comprising the steps of
  treating the twisted carbon cord with a liquid isocyanate solution for soaking of the carbon cord;
  optionally drying and optionally heat-treating the carbon cord soaked with liquid isocyanate solution;
  winding soaked carbon cord in the form of tensile strands of a tension member around a drum;
  introducing a solution of reaction partners for formation of the belt body composed of elastic material;
  forming the drive belt under the action of pressure and/or temperature on the reaction partners and the wound treated carbon cord in order to form a drive belt having a belt body and tension members composed of carbon cord, wherein the elastic material of the belt body at least partially encloses the tension members;
characterized in that the soaked carbon cord is not subjected to curing before being brought into contact with the reaction partners for formation of the belt body.

According to the invention, twisted carbon cord is used in this case. The twisting of the carbon fibers, which precedes the treatment of the carbon cord, ensures a uniform and compact orientation of the carbon fibers in the carbon cord. This furthermore leads to lower tension loss of the tensile strands in the belt, and thus of the entire belt. Suitable twisted carbon cords are known to those skilled in the art. In one embodiment, these twisted carbon cords are singly twisted carbon cords, but doubly twisted carbon cords may also be used. In one embodiment, in the case of singly twisted carbon cord, the latter is twisted with a twist of at most 60 t/m, such as at most 50 t/m, for example at most 45 t/m, such as at most 40 t/m.

The carbon cords can be customary carbon cords, as are used already in belts for power transmission and for driving, in particular as are used in toothed belts. In particular, a carbon cord is a cord that is an inorganic cord. That is to say the carbon cords are composed substantially of carbon fibers and differ from organic fibers such as aramid fibers or polyester fibers, in particular in that they contain no oxygen or nitrogen atoms.

In one embodiment, the tension members are consisting of carbon fibers; alternatively, the carbon cords may also have less than 50% of synthetic fibers, such as aramid fibers, polyamide fibers, polyester fibers, etc., added thereto. Unless stated otherwise, the term "carbon cord" in the present case comprises both those cords consisting of carbon fibers and those cords in which other synthetic fibers are present in an amount of <50%.

The method according to the invention involves treating the twisted carbon cord with a liquid isocyanate solution. This treatment involves soaking the carbon cord with the liquid isocyanate solution. In this case, this liquid isocyanate solution can penetrate into, and remain in, the interstices of the cord. That is to say that, after soaking of the carbon cord, the liquid isocyanate solution is present between the strands of the carbon cord and in the form of an at least partial sheathing, such as a complete sheathing of the carbon cord, but also in the interstices of the cord itself.

The expression "soak" is understood to mean that this liquid isocyanate solution impregnates, sheaths and/or penetrates the carbon cord.

This liquid isocyanate solution can be introduced into the carbon cord in accordance with customary methods, for example by dipping, immersing, pulling through a corresponding bath, etc. Suitable methods and further method steps for soaking the carbon cord are known to those skilled in the art.

The soaked carbon cord may optionally subsequently be dried and optionally subsequently subjected to a heat treatment. Drying can be effected at room temperature or elevated temperature under suitable conditions, and the same applies to the heat treatment. Here, one or both steps can be carried out at least in part in a vacuum. In one embodiment, it is important that the treating of the cord, the subsequent drying and the further handling of the cord are carried out in the presence of as little moisture as possible, since the isocyanates used are sensitive, that is to say reactive, to moisture. Correspondingly, in one embodiment, the drying and/or heat treatment and subsequent storage are carried out with exclusion of moisture. In one embodiment, the isocyanates used may comprise blocked isocyanates. When using these blocked isocyanates with suitable protective groups which are liberated on curing, handling is simplified. In one embodiment, no blocked isocyanates are present.

The method according to the invention is characterized in that the soaked carbon cord is not subjected to curing before the soaked carbon cord is brought into contact with the reaction partners for formation of the belt body. What is achieved as a result is that there is as great a reactivity as possible with the constituents and reaction partners of the elastomeric material that forms the belt body. Correspondingly, there is specifically no prior reaction of the isocyanate with other reaction partners, such as, for example, even with moisture and water.

Rather, provision is made according to the invention for the isocyanates which according to the invention are present in the cord to react with the reaction partners of the belt elastomer. Examples of customary reaction partners for formation of the belt elastomer are polyurethane prepolymers with reactive isocyanate groups and primary amines, for example diamine, as curing agent. These react correspondingly to form the belt elastomer. During the curing of the belt elastomer, in the case of which a belt winding is formed, in addition to the reaction of the polyurethane prepolymer with the diamine to form the belt elastomer, the polyurethane prepolymer or the finished belt elastomer, that is to say a polyurethane-urea, also reacts with the isocyanate present in the cord, with formation of corresponding covalent bonds. However, it is indeed possible for the isocyanate, on account of its high reactivity, to react with all of the reaction partners that are present in the production method. In this way, improved bonding, that is to say adhesion, of the cord to the surrounded belt elastomer is obtained. This drive belt is characterized by a long service life and excellent flexural stability, such as flexural strength and improved tension behavior, and also improved bonding to the elastomeric material of the belt body.

In one embodiment, the elastic material is a polyurethane, and therefore the drive belt is a belt comprising a polyurethane elastomer and a carbon cord.

It has been shown that on account of the treatment of the cord according to the invention, in belt running time tests the drive belts obtained has advantages compared with belts comprising untreated cord but also compared with a cord treated with simple polyurethane. The prior art requires that reaction products be present in the form of fillers in order to improve the cord properties. In contrast thereto, it is precisely this reaction for formation of reaction products that is avoided according to the invention, it rather being the case that the isocyanates are present in reactive form for reaction with the reaction partners of the belt elastomer.

Correspondingly, in the method according to the invention, the soaked carbon cord in the form of tensile strands of a tension member is wound around the drum, preferably with exclusion of moisture. If blocked isocyanates are also present, exclusion of moisture is not necessary. In one embodiment, the winding can in this case be endless winding. This means that the cord is an endless cord which is wound endlessly around the drum. In the present case, endlessly means that the cord is wound multiple times, such as at least two times, around the drum. The reaction partners for formation of the belt body composed of elastic material are subsequently introduced. This can typically be effected by casting these reaction partners. This belt winding which is then present is then reacted with the corresponding reaction partners under the action of pressure and/or temperature and cured in order to form a drive belt having a belt body and tension members composed of carbon cord, wherein the elastic material of the belt body at least partially encloses the tension members.

In one embodiment, the isocyanate solution according to the invention is a solution comprising a polyisocyanate. In one embodiment, this polyisocyanate is a diisocyanate. Suitable isocyanates are known to those skilled in the art. A suitable form is an MDI (methylene diphenyl isocyanate), which may be present in the form of PMDI, that is to say with various constituents. At least some of the isocyanates can be blocked isocyanates. Blocked isocyanates are known to those skilled in the art. They are thermally unstable and break down, that is to say unblock, at elevated temperature. Such unblocking can occur at temperatures at which the formation of the belt takes place, such as the curing.

In one embodiment, the isocyanates may be present dissolved in a solvent. Suitable solvents for the corresponding isocyanates are known to those skilled in the art. These are in particular organic solvents. For example, MDI dissolved in toluene can be used.

In order to achieve corresponding wetting or soaking or impregnation of the carbon cord, the liquid isocyanate solution should have a low viscosity. In the case of toluene as solvent, this viscosity can be 0.6 mPa×s.

In one embodiment, an isocyanate solution which permits soaking of the carbon cord in such a way that the isocyanate is present in an amount of 2 to 10% by weight in relation to the carbon cord, preferably 3 to 7% by weight in relation to the carbon cord, is used. Depending on the selected treatment method and/or the drying method, said solution may be an isocyanate-toluene solution having a very high or very low isocyanate concentration. Correspondingly, it is for example possible for an isocyanate solution with toluene as solvent to contain the isocyanate in an amount of 12 to 25% by weight, such as 12 to 20% by weight, in relation to the toluene.

In one embodiment of the present invention, an MDI solution in toluene is used for soaking the carbon cord.

In one embodiment of the present invention, the method according to the invention furthermore comprises that the soaked carbon cord, that is to say the carbon cord treated with the isocyanate solution, is subjected to no further coating or no further soaking of the carbon cord with other solutions prior to the carbon cords being wound around a drum and the reaction partners for formation of the belt body composed of elastic material being added. In particular, there is no partial polymerization or reaction of the isocyanate with water or by atmospheric moisture in order to form an isocyanate which has reacted in any way or, for example, a prepolymer.

It has been shown that omission of these further steps and omission of further coatings and fillers of other materials make it possible to obtain an improved service life and flexural stability of the belt with the tensile strand composed of carbon cord.

In one embodiment, the carbon cord is a cord having a tex of 200 to 3600 and/or a diameter of 0.3 to 2.4 mm.

In one embodiment, the carbon cord is in this case not in the form of a textile, in particular not in the form of a woven fabric or knitted fabric. In particular, the cord is thus not a textile tensile strand.

In one embodiment, the belt body comprising elastic material is a body composed of a polyurethane material. Use can be made of customary synthetic elastomers as are used for drive belts such as power transmission belts and conveyor belts, these elastomers being, in particular, belt polyurethanes and especially toothed belt polyurethanes.

In one embodiment, the belt body is not a radically crosslinkable or radically polymerized material or elastomer.

Preferably, the synthetic elastomer of the belt body is therefore a polyurethane. In one embodiment, the isocyanate component of the polyurethane is in this case the same isocyanate as was introduced, according to the invention, as liquid isocyanate solution for soaking the carbon cord.

The drive belt may be a power transmission belt or conveyor belt, preferably a toothed belt. The invention is also suitable for other belt shapes such as for example V-belts, V-ribbed belts or flat belts.

Furthermore, the method according to the invention may comprise the application of a textile overlay as outer layer. This textile overlay forms, in particular, the outer layer of the power transmission zone. The textile overlay may furthermore comprise, for example, an outer coating which influences the surface properties.

In one embodiment, the elastic material is a material formed from a polyurethane prepolymer with reactive isocyanate groups and a primary amine, in particular a diamine, as curing agent.

In one embodiment, the drive belt comprises carbon cords, wherein all of the carbon cords are present soaked with the isocyanate solution. In an alternative embodiment, according to the invention, at least some of the carbon cords can be soaked with liquid isocyanate solution.

Furthermore, according to the invention, a drive belt obtainable by the method according to the invention is provided. This drive belt is characterized by a long service life and excellent flexural stability, such as flexural strength and improved tension behavior, and also improved bonding to the elastomeric material of the belt body.

The drive belt can in particular be a high performance belt having carbon cord as tension member and polyurethane as elastic material of the belt body. The belt body can in this case comprise belt teeth for formation of a toothed belt. It is furthermore optionally possible for the drive belt to have a coating with a textile overlay in the power transmission zone of the drive belt.

The invention will be described below on the basis of exemplary embodiments which serve solely for illustration and do not restrict the scope of the invention, as described above.

Figure 2:
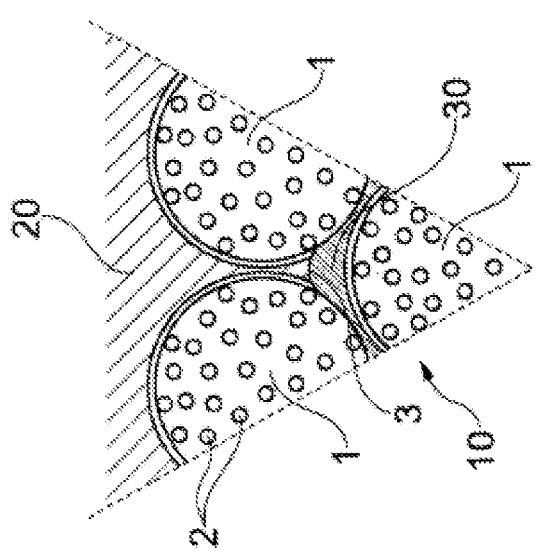
Figure 3:
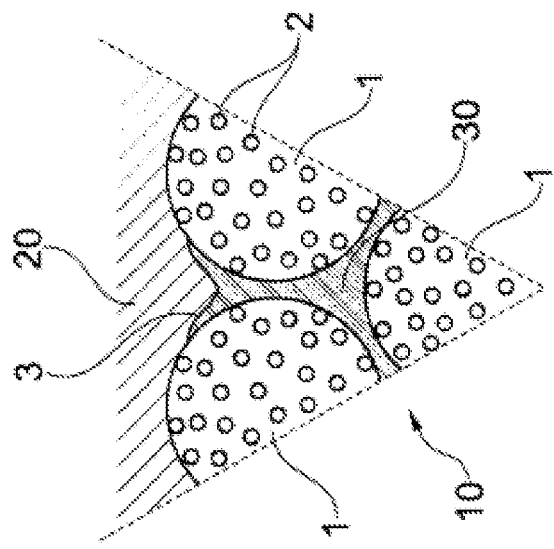

FIGS. 1 to 3 show sectors of different cord cross sections with respect to the elastomeric material, here filled cord enclosed in polyurethane.

FIG. 1 shows a cross-sectional illustration, in which only one segment of a cord 10 is shown, with a cord 10 embedded in polyurethane with the strands 1 and carbon fibers 2 indicated therein. The polyurethane material 20 of the belt body embeds the cord, with the isocyanate 30 having been placed around the strands 1. In the boundary region 3, the isocyanate is in a state reacted with the polyurethane, such that good bonding of the cord to the belt body is effected here. It is also possible for the isocyanate solution to have potentially penetrated into the strands 1.

FIG. 2 shows a further exemplary embodiment. In this example, the isocyanate solution 30 is located in the form of a coating on one of the inner strands 1, such that the polyurethane 20 in the edge region of the cord can penetrate further into the interstices between the outer strands 1 of the cord material. In this case, an optimal mechanical interlocking of the polyurethane 20 of the belt body, said polyurethane embedding the cord 10, with the cord strands 1 is produced. The sufficient flexural stability and elasticity, and also bonding to the belt body, is ensured by the isocyanate 30. There is sufficient bonding between the isocyanate 30 and the polyurethane 20 at the common boundary surface 3.

FIG. 3 shows a third exemplary embodiment, in which the shown strands 1 of the cord 10 are coated with the isocyanate 30. In this way, the cord 10 is at the same time sheathed with the isocyanate 30. The correspondingly very large surface 3 with respect to the polyurethane 20 makes it possible to produce correspondingly good adhesion by bonding.

An essential aspect is that the cord is soaked if this cord is in the form of twisted carbon fibers, and that the isocyanate which is present on or in the cord after the soaking is not partially polymerized or otherwise reacted, or does so only to a very minor extent, prior to reaction with the reaction partners for formation of the elastic material of the belt body.

The invention claimed is:

1. A method for producing a drive belt having a belt body composed of elastic material and tension members with tensile strands, wherein at least one tension member with the tensile strands of the tension members is formed from a multiplicity of carbon fibers which are twisted together to form a twisted carbon cord, comprising:
    treating the twisted carbon cord with a liquid isocyanate solution not containing other reaction partners forming the elastic material to produce a soaked, twisted carbon cord;
    optionally drying and optionally heat-treating the twisted carbon cord after soaking with liquid isocyanate solution;
    then winding the soaked, twisted carbon cord in a form of tensile strands of the at least one tension member around a drum;
    then introducing a solution of reaction partners forming the elastic material of the belt body to the soaked, twisted carbon cord wound on the drum for formation of the belt body composed of elastic material;
    then forming the drive belt under the action of pressure and/or temperature on the reaction partners and the soaked, twisted carbon cord wound on the drum, wherein the belt body of the drive belt comprises the tension members with the at least one tension member that is composed of the twisted carbon cord, wherein the elastic material of the belt body at least partially encloses the tension members;
wherein the soaked, twisted carbon cord is not subjected to curing before being brought into contact with the reaction partners for formation of the belt body and after winding the soaked, twisted carbon cord around the drum, wherein no coating or soaking of the soaked, twisted carbon cord other than treating the twisted carbon cord with the liquid isocyanate solution, is carried out before introduction of the solution of reaction partners for formation of the belt body composed of elastic material, and wherein the reaction partners for formation of the belt body composed of elastic material are introduced as a prepolymer with a curing agent, wherein the belt body comprises belt teeth for formation of a toothed belt.

2. The method according to claim 1, wherein the elastic material is a polyurethane material.

3. The method according to claim 1, wherein the isocyanate solution comprises a polyisocyanate.

4. The method according to claim 3, wherein the isocyanate solution is a methylene diphenyl isocyanate solution.

5. The method according to claim 1 wherein the isocyanate solution comprises a solvent.

6. The method according to claim 1 wherein the soaked, twisted carbon cord is dried and/or heat-treated before winding, and wherein the isocyanate solution is present in an amount of 2-10% by weight in relation to the soaked, twisted carbon cord.

7. The method according to claim 1 wherein the liquid isocyanate solution has a viscosity in the range of the viscosity of toluene of 0.6 mPa×s.

8. The method according to claim 1 wherein the twisted carbon cord has a tex of 200-3600 and/or a diameter of 0.3-2.4 mm.

9. The method according to claim 1 wherein the twisted carbon cord is a singly twisted carbon cord with a twist of at most 60 t/m.

10. The method according to claim 1, further comprising applying a textile overlay as an outer layer to the belt body.

11. The method according to claim 1, wherein the introduction involves casting the reaction partners into a mold with the twisted carbon cord wound onto the drum.

12. A drive belt produced by the method according to claim 1.

13. The drive belt according to claim 12 wherein the belt comprises a coating with a textile overlay in a power transmission zone of the drive belt.

14. The method according to claim 3 wherein the polyisocyanate is a diisocyanate.

15. The method according to claim 5 wherein the solvent is an organic solvent.

16. The method according to claim 9 wherein the singly twisted carbon cord has a maximum of 50 turns per meter.

17. The method according to claim 10 wherein the applying is performed at a power transmission zone of the belt body.

18. The method according to claim 10 wherein the prepolymer is a polyurethane prepolymer with reactive isocyanate groups, and wherein the curing agent is a primary amine.

\* \* \* \* \*